United States Patent [19]
Horn

[11] Patent Number: 6,008,465
[45] Date of Patent: Dec. 28, 1999

[54] LASER CUTTING MACHINE AND METHOD FOR LASER CUTTING WITH MEASUREMENT OF RESISTANCE BETWEEN CUTTING HEAD AND WORK PIECE

[75] Inventor: Armin Horn, Renningen, Germany

[73] Assignee: Trumpf GmbH & Co., Germany

[21] Appl. No.: 09/063,558

[22] Filed: Apr. 21, 1998

[30] Foreign Application Priority Data

Apr. 21, 1997 [DE] Germany .............................. 197 16 616

[51] Int. Cl.⁶ ................................................... B23K 26/00
[52] U.S. Cl. .............................. 219/121.62; 219/121.67; 219/121.72; 219/121.83
[58] Field of Search ......................... 219/121.62, 121.67, 219/121.72, 121.83

[56] References Cited

U.S. PATENT DOCUMENTS

| 4,087,672 | 5/1978 | Yi ........................................ 219/121.68 |
| 5,247,155 | 9/1993 | Steen et al. ......................... 219/121.83 |
| 5,489,888 | 2/1996 | Jagiella et al. ...................... 340/537 |

FOREIGN PATENT DOCUMENTS

| 55-117586 | 9/1980 | Japan . |
| 3-198993 | 8/1991 | Japan ............................... 219/121.83 |
| 8-164489 | 6/1996 | Japan . |

Primary Examiner—Gregory Mills
Attorney, Agent, or Firm—Pepe & Hazard LLP

[57] ABSTRACT

A resistance measuring device is coupled with a controller for controlling the parameters of the cutting process. The device is connected between the laser cutting head of the machine of an electrically conducting part of the laser cutting head and workpiece, and the amount of the electrical resistance of the medium between the laser cutting head and the workpiece can be determined when cutting electrically conducting workpieces. In this method, the amount of the electrical resistance of the medium between the laser cutting head and the workpiece is determined, and the distance between the cutting head and workpiece is also determined. Depending on the detected values of the electrical resistance and distance, the parameters of the cutting process are controlled to obtain efficient cutting action.

4 Claims, 1 Drawing Sheet

LASER CUTTING MACHINE AND METHOD FOR LASER CUTTING WITH MEASUREMENT OF RESISTANCE BETWEEN CUTTING HEAD AND WORK PIECE

BACKGROUND OF THE INVENTION

The invention concerns a laser cutter machine for cutting electrically conducting workpieces with a laser cutting head movable relative to the workpiece to be cut and spaced from the latter. The laser cutting head has at least one electrically conducting part, such as an electrically conducting laser nozzle, and the machine includes an arrangement for controlling the parameters of the cutting process. Furthermore, the invention concerns a process for laser cutting of electrically conducting workpieces with a laser cutting head separated from the workpiece to be processed moving at a distance relative to the latter, and the parameters of the cutting process being controlled.

Automated processing machines of this type, as well as the processes mentioned, are customary for carrying out a number of processing measures. In particular, in the case of cutting relatively thick workpieces made of stainless steels, and in this case above all in the case of controlling cutting in the area of corners of workpieces, there can be difficulties in assuring the desired cutting quality. Thus, under the circumstances described, occasionally it may be observed that the laser cutting beam cannot maintain the required cutting depth and accordingly it has to be guided along the cutting line repeatedly and/or with changed cutting parameters until it effects separation of the workpiece.

The object of the present invention is to eliminate the problems described above.

SUMMARY OF THE INVENTION

With respect to the equipment, this process is solved in accordance with the invention by means of a laser cutting machine of the type described initially, which has a resistance measuring device coupled with the device so as to control the parameters of the cutting process. The resistance measuring device is connected between the laser cutting head or an electrically conducting part thereof, in particular the laser nozzle of the laser cutting head and the workpiece. As a result, the amount of the electrical resistance of the medium between the laser cutting head, preferably the laser nozzle, and the work piece can be determined. The solution of the problem in accordance with the invention is based on the new finding that the amount of the electrical resistance of the medium between the laser cutting head and the workpiece makes it possible to draw a conclusion about the cutting quality being obtained. Thus, it has been found that the above mentioned electrical resistance assumes relatively high values when the laser beam penetrates the workpiece easily.

Difficulties in the processing of workpieces, in particular problems with respect to maintaining the required cutting depths of the laser beam, are accompanied by a reduction of the electrical resistance with respect to the values measured in the case of regular cutting operation. Accordingly, the resistance measurement can be made as a comparative measurement. The empirically determined resistance in the case of a regular cutting operation with optimal cutting results forms the starting point here.

A drop in the resistance values is detected by means of the resistance measurement device in accordance with the invention, and, if the change in the resistance values exceeds a predetermined value, this indicates the necessity for adjusting the parameters of the cutting process in order to provide for processing conditions which permit optimal processing of the workpiece in this way. In this sense, the cutting speed can be reduced after measuring relatively low resistance values by the arrangement for controlling the parameters of the cutting process, such as the cutting speed, e.g., the rate of advance of the laser cutting head relative to the workpiece, which arrangement interacts with the resistance measuring device.

Alternatively or supplementally, among other things, varying the nozzle distance, cutting gas pressure, volume of cutting gas, and/or laser beam power also can be used. Alternatively, an increase in the amount of the electrical resistance of the medium between laser cutting head and workpiece of relatively low magnitude signal values to be associated with the regular cutting operation, that the laser beam functionally penetrates the workpiece and that, for example, the speed of movement of the laser cutting head and/or the laser beam power, with respect the instantaneous relations can be further increased. The scope of the change in the parameter or parameters of the cutting process in this case depends on the amount of the deviation of the instantaneous resistance value from the resistance value in the case of a regular cutting operation.

A preferred version of the machine in accordance with the invention is characterized by the fact that the resistance measuring device is coupled with the device for controlling the parameters of the cutting process by an evaluation device, and evaluation device is connected with a distance measuring device for determining the distance of the laser cutting head, in particular the laser nozzle, from the workpiece. Depending upon the amount of the electric resistance determined, as well as the distance of the laser cutting head determined, in particular, the laser nozzle from the workpiece, the evaluation device generates a control signal for the device for controlling the parameters of the cutting process. The evaluation device on the one hand takes account of the measurement result of the resistance measuring device for determining the amount of the electrical resistance of the medium between laser cutting head and workpiece.

On the other hand, the evaluation device also considers the distance existing between the laser cutting head, in particular the laser nozzle, and the workpiece at the moment of the resistance measurement. In this way, remote control of the machine is effected. The use of the distance measuring device in accordance with the invention opens the possibility for checking if, for example, a low electrical resistance value measured by means of the resistance measuring device actually is to be viewed as an indication of a reduced cutting quality, or if this resistance value is a result of the laser cutting head unintentionally coming in contact with the workpiece and thus creating a short circuit, as a result of which the electrical resistance also assumes a low value. Controlling the parameters of the cutting process leading to an increase in the measured resistance values is permitted only in the first mentioned case, in which the electric resistance measured for the medium between laser cutting head and workpiece has a low value and the distance between laser cutting head and workpiece is different from zero.

With respect to the process, the problem indicated above is solved in accordance with the invention by the fact that, within the framework of a process of the type mentioned initially, the amount of the electrical resistance of the medium between the laser cutting head and the workpiece is determined, and the parameters of the cutting process are controlled, depending on the amount of the electrical resistance detected. If an electrical resistance, the amount of which corresponds to the electrical resistance in the case of regular cutting operation with optimal cutting result, is measured for the medium between laser cutting head and workpiece, the adjusted parameters of the cutting process can remain unchanged. If there is a change in the measured resistance value, the parameters of the cutting process are varied in relation to the scope of the resistance change.

In a preferred configuration of the process in accordance with the invention, in controlling the parameters of the cutting process, in each case an amount of the parameter concerned is associated with groups of detected amounts of the electrical resistance. Thus, for example, in the case of electrical resistances of the medium between cutting laser cutting head and workpiece which are of different amounts but are within a predetermined band width, the relative speed of the laser cutting head and workpiece is adjusted to one and the same value.

BRIEF DESCRIPTION OF THE ATTACHED DRAWING

FIG. 1 is a schematic representation of a laser cutting machine embodying the present invention.

DETAILED DESCRIPTION OF THE PREFERRED EMBODIMENT

Figure 1:
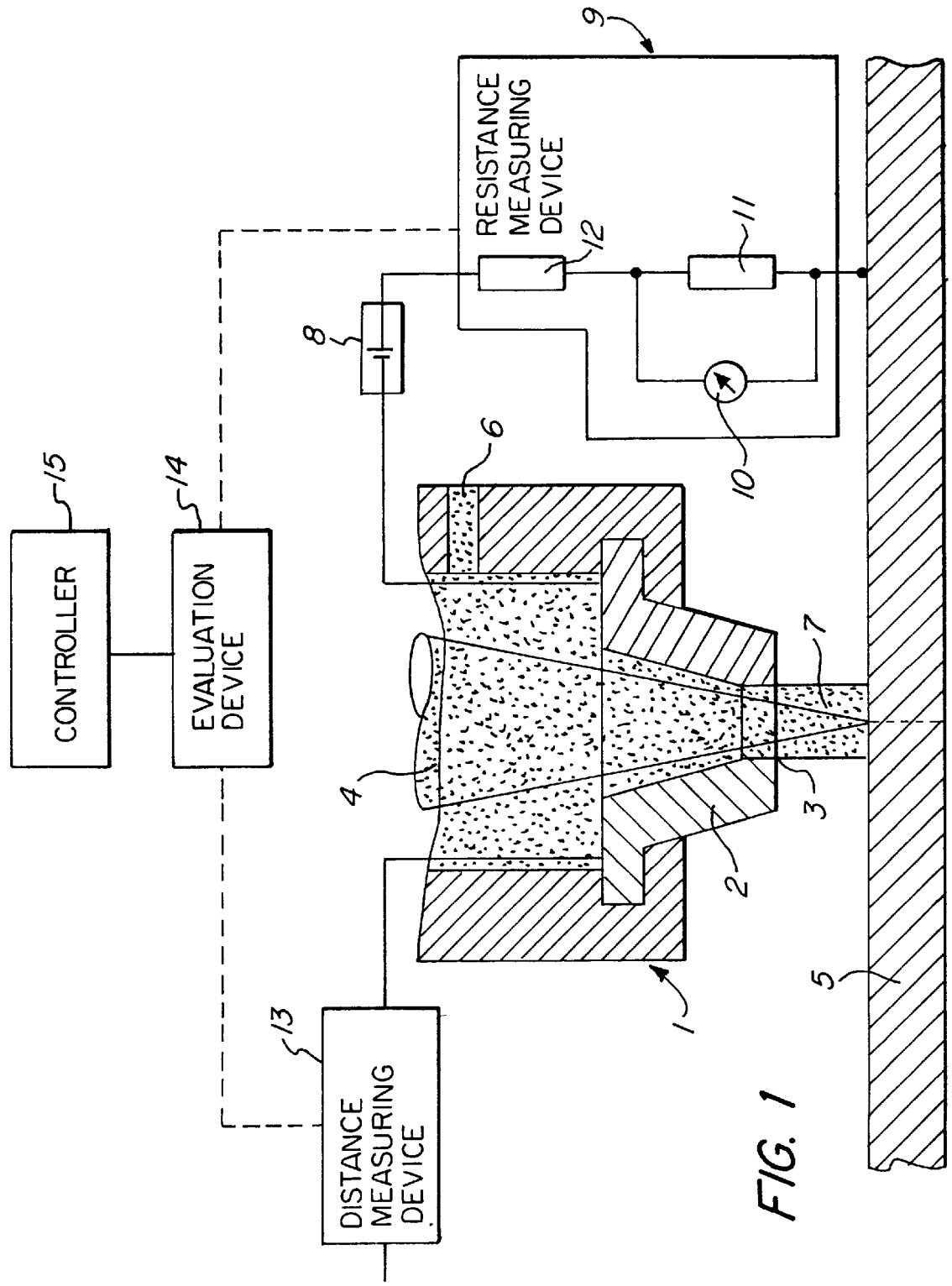

FIG. 1 shows a laser cutting head 1 with a laser nozzle 2 made out of an electrically conducting material, and which is electrically insulated with respect to other parts of the laser cutting head 1. At one nozzle opening 3 exists a laser beam 4 which strikes the workpiece 5 in the form of an electrically conducting stainless steel sheet lying opposite the laser cutting head 1, in order to penetrate the latter, in cutting operation. Cutting gas, in the example shown nitrogen, is supplied to the laser cutting head 1 by a gas supply 6 conduit. A cutting gas jet 7 also emerges from the interior of the laser cutting head 1, also through the nozzle opening 3, and flows in the direction toward the workpiece 5. During the cutting operation, the workpiece 5 is held stationary, and the laser cutting head 1 is kept at a distance relative to the workpiece 5 and moved parallel thereto.

A power source 8 is electrically connected between the laser nozzle 2 and the workpiece 5. A resistance measuring device 9, which, in addition to a measuring device 10, includes a resistor 11 connected in parallel with the device 10 and a resistor 12, is connected between the voltage source 8 and the workpiece 5. In one sense, the laser nozzle 2, the power source 8, and the workpiece 5, are also components of the resistance measuring device. A capacitative resistance measuring device 13 also makes use of the laser nozzle 2 in the known way for determining the distance of the laser cutting head 1 from the workpiece 5.

As is indicated by the broken lines, both the resistance measuring device 9 and the capacitative distance measuring device 13 are connected with a computer-supported evaluation device 14 which is coupled with control means 15 for controlling the parameters of the cutting process, i.e., with the machine control.

During cutting operation of the machine, the electrical resistance of the medium between the laser nozzle 2 and the workpiece is determined continuously by the resistance measuring device 9. In the case of regular cutting conditions, under which a separating cut with the desired quality is produced in the workpiece by means of the laser beam 4, the measured resistance assumes a substantially constant and continuous value. If there are difficulties in maintaining the required cutting depth of the laser beam in the area of the cutting point, for example in the case of a curved path of the laser cutting head 1 with great curvature with given parameters of the cutting process, the electrical resistance determined simultaneously by means of the resistance measuring device 9 decreases considerably as compared with the output state. This resistance reduction, or as the case may be, the resulting reduced resistance value is determined by means of the evaluation device 14.

The resistance measuring device can be used also in the case of using the laser beam to cut a recess in the workpiece 5. Thus, the advance of the laser cutting head 1, that is the relative motion thereof with respect to the workpiece 5, can be used only when the laser beam 4 directed onto the workpiece 5 at the beginning of the cutting penetrates the workpiece for the first time, therefore has "cut through" the workpiece 5. Until this is the case, the electrical resistance of the medium between laser nozzle 2 and the workpiece 5 has a relatively low value. The amount of the electrical resistance increases suddenly as soon as the laser beam 4 penetrates the workpiece 5. The increase in the electrical resistance described is determined by means of the resistance measuring device 9 and marks the moment at which the advance of the laser cutting head 1 with respect to the workpiece 5 in the cutting direction can begin. The evaluation and control of the movement are performed by the machine control.

The possibility of detecting the advance of the laser cutting head 1 at the earliest possible moment and thus carrying out the processing of the workpiece with minimum processing time is possible.

Having thus described the invention, what is claimed is:

1. A laser cutting machine for cutting electrically conducting workpieces comprising:

(a) a laser beam generator for generating a laser beam;

(b) a laser cutting head coupled to said laser beam generator and movable at a distance relative to workpiece to be processed, said cutting head having an electrically conducting portion and being adapted to direct the laser beam onto the workpiece to be processed;

(c) control means for controlling the parameters of the cutting process said parameters of operation comprising steed of advance of the cutting head relative to the workpiece, spacing of the cutting head from the workpiece, volume and pressure of cutting gas, and laser beam power;

(d) a distance measuring device for determining the distance between said cutting head and the workpiece and providing a signal to said control means;

(e) a resistance measuring device connected between said conducting portion of said laser cutting head and the workpiece to estimate the amount of electrical resistance of the medium between said laser cutting head and the workpiece and to generate a signal to said control means; and (f) evaluating means for processing the signals from said distance measuring device and from said resistance measuring device to determine the existence of spacing between said cutting head and the workpiece and providing an output to said control means for controlling said parameters of operation of the laser cutting process to cut the workpiece.

2. The laser cutting machine in accordance with claim 1 wherein said electrically conducting portion of said laser cutting head comprises a laser nozzle on said cutting head.

3. A process for laser cutting of electrically conducting workpieces comprising:
  (a) locating a laser cutting head at a distance from a workpiece to be processed and generating a laser beam impinging upon said workpiece, said cutting head being movable relative to said workpiece;
  (b) determining the electrical resistance between said laser cutting head and said workpiece to estimate the value of the electrical resistance of the medium between said laser cutting head and said workpiece;
  (c) determining the distance between said laser cutting head and said workpiece;
  (d) processing the values for electrical resistance and distance to determine the existence of spacing between said cutting head and the workpiece and to generate an output based upon the estimated resistance value; and
  (e) controlling the parameters of the cutting process depending upon said estimated value of the electrical resistance of said medium, said parameters comprising speed of advance of the cutting head relative to the workpiece, spacing of the cutting head from the workpiece, volume and pressure of cutting gas, and laser beam power.

4. The process of laser cutting in accordance with claim 3 wherein said parameters of said cutting process are associated with groups of detected values for electrical resistance.

* * * * *